United States Patent [19]

Rutherford et al.

[11] Patent Number: 5,566,496
[45] Date of Patent: Oct. 22, 1996

[54] UNIVERSAL CRANK BAIT LURE

[76] Inventors: Darin C. Rutherford, 5205 S. Walnut St.; Donald E. Rutherford, II, 4809 West Cr. 500, S., both of Muncie, Ind. 47302

[21] Appl. No.: 596,584

[22] Filed: Feb. 5, 1996

[51] Int. Cl.⁶ .................................................. A01K 85/00
[52] U.S. Cl. ........................................ 43/42.09; 43/42.47
[58] Field of Search ............................. 43/42.09, 42.22, 43/42.31, 42.47

[56] References Cited

U.S. PATENT DOCUMENTS

| | | | |
|---|---|---|---|
| 2,618,096 | 11/1952 | Wagner | 43/42.47 |
| 4,402,155 | 9/1983 | Mumma | 43/42.09 |
| 4,432,156 | 2/1984 | Gowing | 43/42.31 |
| 4,432,157 | 2/1984 | Gowing | 43/42.31 |
| 4,697,378 | 10/1987 | Tunstall | 43/42.22 |
| 4,727,674 | 3/1988 | Garr | 43/42.47 |
| 4,807,387 | 2/1989 | Dougherty | 43/42.22 |

FOREIGN PATENT DOCUMENTS 0042155  8/1969  Finland .................................. 43/42.09

*Primary Examiner*—Joseph J. Hail, III
*Assistant Examiner*—James Miner

[57] ABSTRACT

A universal crank bait lure including a rigid body portion that has a head end and at least one hook attached thereto. Included are a plurality of interchangeable, rigid bill inserts each having a back end with a locking tab. The locking tab is positionable within an opening of the head end of the body portion. The locking tab of each bill insert is capable of engaging an interior ledge of the opening with a snap fit. Each bill insert has an eye-hook attached mid-way a front end and the back end, and has a fishing line tied thereto. Lastly, a passage is accessible from a bottom side of the head end and interconnecting with the opening of the head end of the body portion. The passage is capable of receiving an ejector tool with a shaft for positioning within. The shaft is capable of applying a lift force to the locking tab for release of each bill insert from within the head end.

8 Claims, 3 Drawing Sheets

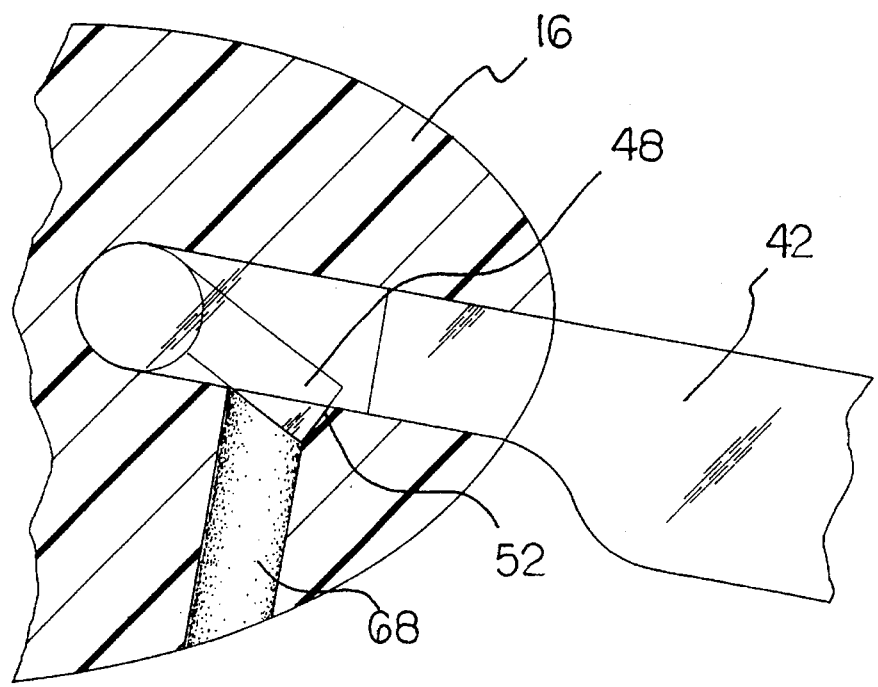
FIG. 7
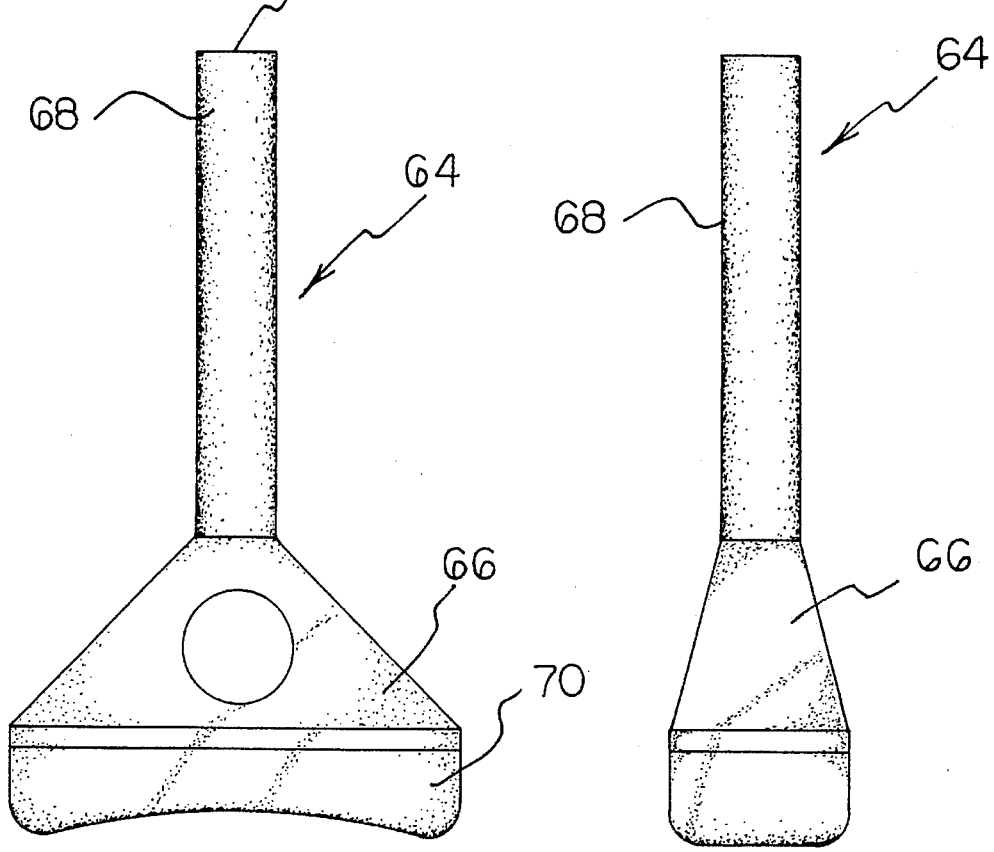
FIG. 8
FIG. 9

UNIVERSAL CRANK BAIT LURE

BACKGROUND OF THE INVENTION

1. Field of the Invention

The present invention relates to a universal crank bait lure and more particularly pertains to allowing a rattling fishing lure to be combined with interchangeable bill inserts, with the bill inserts functioning as diving planes to facilitate retrieval depth control.

2. Description of the Prior Art

The use of a fishing lure is known in the prior art. More specifically, fishing lures heretofore devised and utilized for the purpose of attracting and catching fish are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 5,331,762 to Banks discloses a fishing lure with interchangeable heads. U.S. Pat. No. 5,301,453 to Terrill discloses a fishing lure with interchangeable body sections. U.S. Pat. No. 5,001,856 to Gentry discloses a rattling fishing lure. U.S. Pat. No. 4,995,189 to Crihfield discloses a rattling fishing lure. U.S. Pat. No. 4,791,750 to Gammill discloses a fishing lure with internal rattler. Lastly, U.S. Pat. No. 4,569,147 to Margulis discloses a minimal weight fishing lure producing oscillatory motion and utilizing interchangeable parts.

While these devices fulfill their respective, particular objectives and requirements, the aforementioned patents do not describe a universal crank bait lure that allows a singular lure body to be modified for use in different water depths by interchanging bill inserts at the head end of the body, and further allowing the body to include a rattle chamber for attracting the fish.

In this respect, the universal crank bait lure according to the present invention substantially departs from the conventional concepts and designs of the prior art, and in doing so provides an apparatus primarily developed for the purpose of allowing a rattling fishing lure to be combined with interchangeable bill inserts, with the bill inserts functioning as diving planes to facilitate retrieval depth control.

Therefore, it can be appreciated that there exists a continuing need for a new and improved universal crank bait lure which can be used for allowing a rattling fishing lure to be combined with interchangeable bill inserts, with the bill inserts functioning as diving planes to facilitate retrieval depth control. In this regard, the present invention substantially fulfills this need.

SUMMARY OF THE INVENTION

In view of the foregoing disadvantages inherent in the known types of fishing lures now present in the prior art, the present invention provides an improved universal crank bait lure. As such, the general purpose of the present invention, which will be described subsequently in greater detail, is to provide a new and improved universal crank bait lure and method which has all the advantages of the prior art and none of the disadvantages.

To attain this, the present invention essentially comprises a rigid body portion that has a head end, a tail end and a mid-section therebetween. The body portion has a top side with scale indicia thereon and a bottom side. The head end has facial indicia. The tail end has a rear eyelet with a rear hook attached. The mid-section has a bottom eyelet projection projecting from the bottom side and capable of having a bottom hook attached. Included are a plurality of interchangeable, rigid bill inserts that have a generally rectangular shape. Each bill insert has a back end and a front end. The back end of each bill insert has a locking tab centrally positioned therein. The back end of each bill insert is positionable within an opening of the head end of the body portion. The locking tab of each bill insert is capable of engaging an interior ledge of the opening with a snap-like fit. The locking tab of each bill insert is capable of allowing each bill insert to be singly secured within the body portion when the back end is positioned therein. Each bill insert has an eye-hook attached thereon and mid-way the front end and the back end. The eye-hook of each bill insert has a fishing line tied thereto. The front end of each bill insert is capable of providing a diving plane for the body portion. The diving plane of each bill insert varies in length from that of another bill insert for varying the running depth of the body portion. Also, an elongated passage is accessible from a bottom side of the head end. The passage interconnects with the opening of the head end of the body portion near the interior ledge. The passage is capable of receiving an ejector tool therein. The ejector tool has a handle portion and a cylinder shaft projecting from the handle. The Shaft of the ejector is positionable within the passage for engaging the locking tab of each of the bill inserts when positioned within the head end. The shaft is capable of applying a lift force to the locking tab to allow release of each bill insert from within the head end. Lastly, a generally pyramidal rattling chamber is positioned within the body portion. The chamber has a plurality of rigid balls loosely positioned therein. Each ball has a substantially spherical diameter and is capable of rolling within the chamber for the creation of a rattling sound. The chamber, with the balls therein, is centrally positioned within the body portion for maintaining a proportionate weight balance when each of the bill inserts is attached.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved universal crank bait lure which has all of the advantages Of the prior art fishing lures and none of the disadvantages.

It is another object of the present invention to provide a new and improved universal crank bait lure which may be easily and efficiently manufactured and marketed.

It is further object of the present invention to provide a new and improved universal crank bait lure which is of durable and reliable constructions.

An even further object of the present invention is to provide a new and improved universal crank bait lure which is susceptible of a low cost of manufacture with regard to both materials and labor, and which accordingly is then susceptible of low prices of sale to the consuming public, thereby making such universal crank bait lure economically available to the buying public.

Still yet another object of the present invention is to provide a new and improved universal crank bait lure which provides in the apparatuses and methods of the prior art some of the advantages thereof, while simultaneously overcoming some of the disadvantages normally associated therewith.

Even still another object of the present invention is to provide a universal crank bait lure for allowing a rattling fishing lure to be combined with interchangeable bill inserts, with the bill inserts functioning as diving planes to facilitate retrieval depth control.

Lastly, it is an object of the present invention to provide a new and improved universal crank bait lure including a rigid body portion that has a head end and at least one hook attached thereto. Included are a plurality of interchangeable, rigid bill inserts each having a back end with a locking tab. The locking tab is positionable within an opening of the head end of the body portion. The locking tab of each bill insert is capable of engaging an interior ledge of the opening with a snap-like fit. Each bill insert has an eye-hook attached mid-way a front end and the back end, and having a fishing line tied thereto. Lastly, a passage is accessible from a bottom side of the head end and interconnecting with the opening of the head end of the body portion. The passage is capable of receiving an ejector tool having a shaft for positioning within. The shaft is capable of applying a lift force to the locking tab for release of each bill insert from within the head end.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 7 is a cross section cut-away view of the present invention in an operable configuration with the bill insert.

FIG. 8 is a front elevational view of the ejector tool of the present invention.

FIG. 9 is a side elevational view of the ejector tool of the present invention.

The same reference numerals refer to the same parts through the various Figures.

DESCRIPTION OF THE PREFERRED EMBODIMENT

Figure 1:
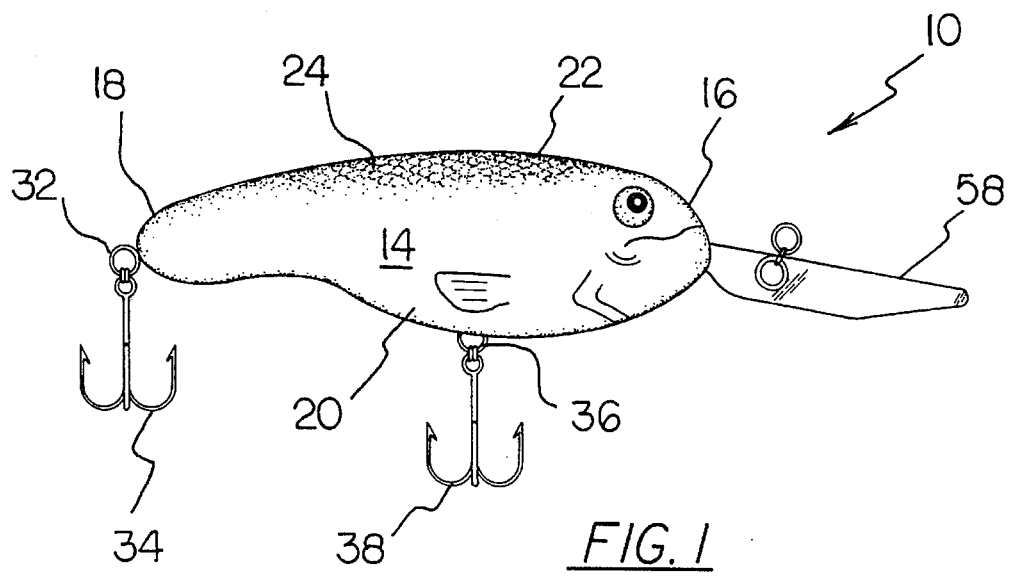
FIG. 1 is perspective view of the preferred embodiment of the universal crank bait lure constructed in accordance with the principles of the present invention.

With reference now to the drawings, and in particular to FIGS. 1 and 8 thereof, the preferred embodiment of the new and improved universal Crank bait lure embodying the principles and concepts of the present invention and generally designated by the reference numeral 10 will be described.

The present invention, the universal crank bait lure 10 is comprised of a plurality of components. Such components in their broadest context include a body portion, a bill insert and an ejector tool. Such Components are individually configured and correlated with respect to each other so as to attain the desired objective.

Figure 4:
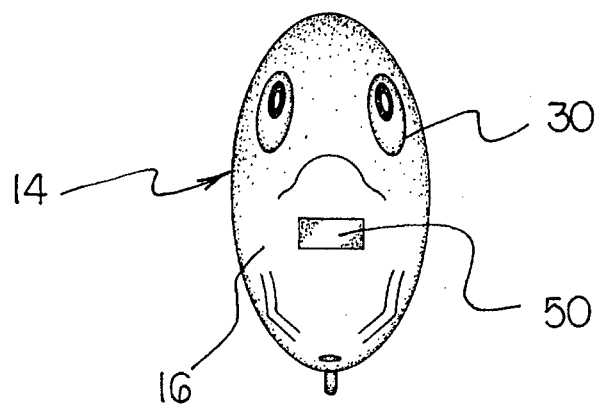
FIG. 4 is a frontal view of the body portion of the present invention.

Specifically, the present invention includes a rigid body portion 14 that has a head end 16, a tail end 18 and a mid-section 20 therebetween. As seen in FIG. 1, the body portion has a top side 22 with Scale indicia 24 thereon. The body portion has a bottom side 28, that is structured to have the appearance of a minnow. The body portion is not limited to a minnow appearance. The head end has facial indicia 30, as shown in FIG. 4. The body is formed of a lightweight plastic that is available in a variety of sizes and colors. The size and colors chosen are of the type currently being used commercially to attract a variety of fish. The tail end has a rear eyelet 32 with a rear hook 34 attached. The mid-section has a bottom eyelet 36 projecting from the bottom side and capable of having a bottom hook 38 attached. Preferably, the rear hook and the bottom hook are each treble-hooks.

Figure 2:
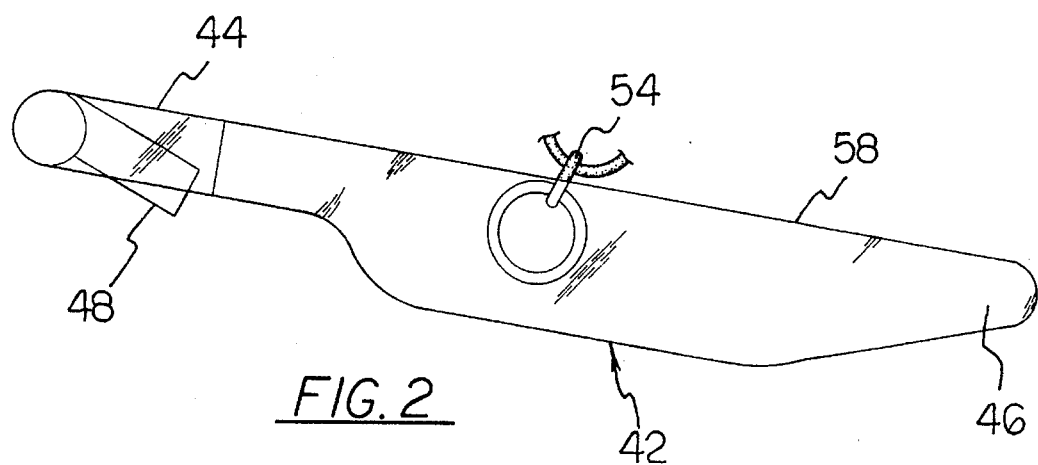
FIG. 2 is a side elevational view of a bill insert of the present invention as shown in FIG. 1.

Included area plurality of interchangeable, rigid bill inserts 42 that have a generally rectangular shape. FIG. 2 depicts the shape and appearance of each bill insert. Each bill insert has a back end 44 and a front end 46. Each bill insert is formed of a plastic or metal. Preferably, a translucent plastic is used. A translucent plastic will not effect the general appearance of the lure.

Figure 3:
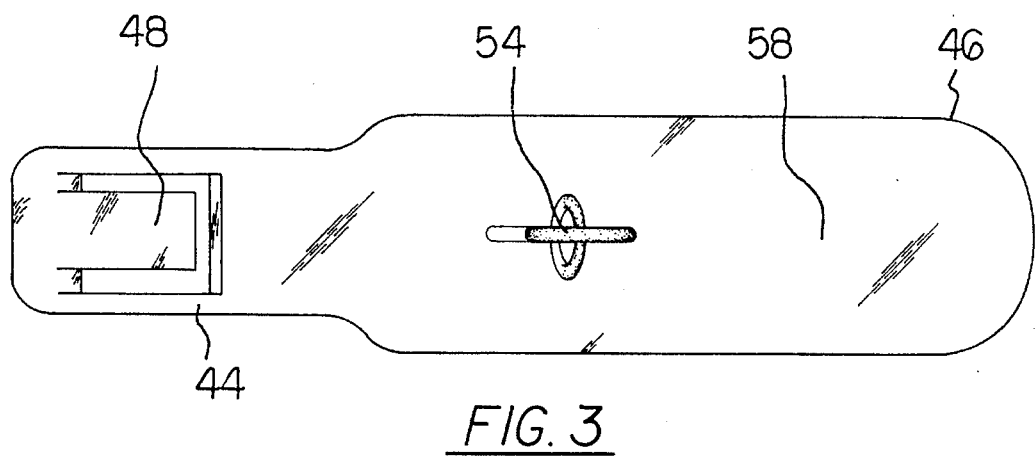
FIG. 3 is a top plan view of the bill insert of FIG. 2.

The back end of each bill insert has a locking tab 48 that is interconnected and centrally positioned therein, as seen in FIG. 3. The back end of each bill insert is positioned within an opening 50 of the head end of the body portion 14. The locking tab of each bill insert is capable of engaging an interior ledge 52 of the opening with a snap-like fit. The interior ledge and the opening are each shown in FIG. 6. The locking tab of each bill insert is capable of allowing each bill insert to be singly secured within the body portion when the back end is positioned therein.

Each bill insert has an eye-hook 54 attached thereon and mid-way the front and 46 and the back end 44. The eye-hook of each bill insert is capable of having fishing line tied thereto. Each bill insert varies in length, while maintaining the same width at the back end and front end, when provided to attach to the same size body portion. The back end of each bill insert will work with any of the differently sized body portions. The shorter the bill insert length, the shallower the depth. The greater the length of the bill insert, the lower the depth. The maximum depth is dependant on the body size and the bill insert length. The length of the bill insert enables the front end of each bill insert to provide a diving plane 58 for the body portion. The diving plane of each bill insert varies in length from that of another bill insert for varying the running depth of the body portion.

Figure 5:
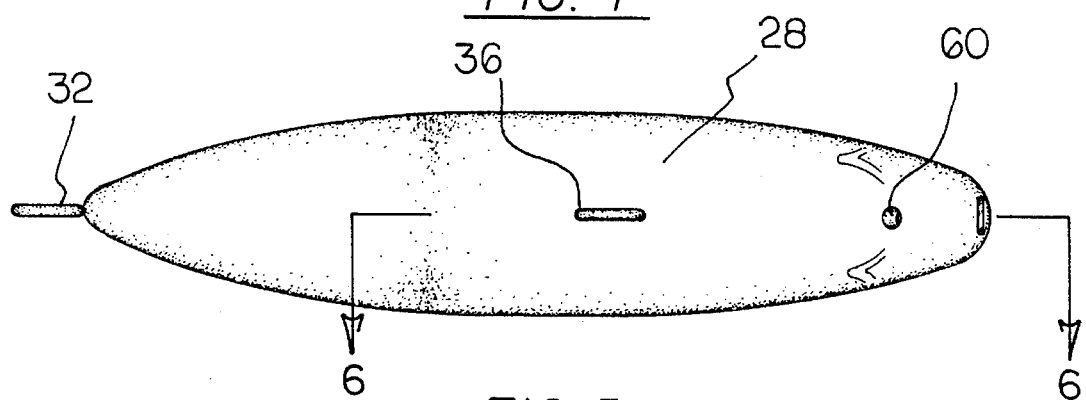
FIG. 5 is bottom view of the body portion of the present invention.
Figure 6:
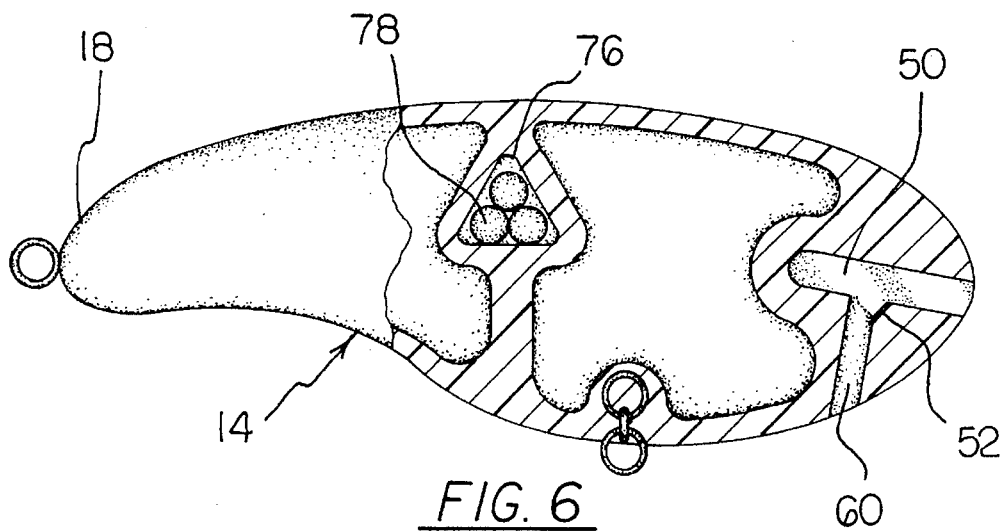
FIG. 6 is a cross sectional cut-away view of the body portion taken along line 6—6 of FIG. 5.

Also, an elongated passage 60 is accessible from a bottom side of the head end, as shown in FIG. 5. The passage interconnects with the opening of the head end of the body portion near the interior ledge, as seen in FIG. 6. The passage has a diameter of one-eighth inch. The passage is cylinder and capable of receiving an ejector tool 64 therein.

The ejector has a handle portion 66 and a cylinder shaft 68 projecting from the handle. The shaft of the ejector is positionable within the passage to engage the locking tab 48 of each of the bill inserts 42, when the bill insert is positioned within the head end. The shaft applies a lift force to the locking tab to allow release of each bill insert from within the head end.

Additionally the ejector tool 64, as seen in FIGS. 8 and 9, are formed of a rigid plastic or metal. Either material is suitable for use. The handle of the ejector tool has a generally conical shape with a wing-tipped end 70. The shaft has a flat top end 72 that engages the locking tab. The flat top end engages the locking tab at the interior ledge 52 of the head end, as seen in FIG. 7. The ejector tool allows easy removal of the bill insert from the body portion without any damage to the locking tab of the bill insert.

Lastly, a generally pyramidal rattling chamber 76 is positioned within the body portion 14. The chamber, as seen in FIG. 6, has a plurality of rigid balls 78 loosely positioned therein. The chamber is constructed of the same material used to make the body portion and formed when the body portion is formed. The chamber, with the balls therein, is centrally positioned within the body portion for maintaining a proportionate weight balance when each of the bill inserts is attached. The chamber and the balls, once placed in the body portion, are not removable.

Furthermore, each ball has a substantially spherical diameter and is formed of a non-magnetic material. The material used to construct the balls may be a metal, glass or a ceramic. The balls are capable of rolling within the chamber for creation of a rattling sound. The rattling sound will attract the fish to the lure.

The present invention is an easy to use universal crank bait lure. The lure comes with a variety of interchangeable bill inserts that can easily modify the lure of use in different water depths. The bill insert come in three different sizes. The size of the bill insert is determined by the length of the bill insert. Each bill insert can be slipped out of the head end of the body portion to allow another bill insert to be snapped into place. Attached to each bill insert is an eye-hook for tying the fishing line onto. Each of the three bill inserts are structured to work with any of the body portions of the fishing lure.

In packaging, the present invention includes one body portion, three bill inserts and two ejector tools. The two ejector tools are the same which are provided with an extra ejector tool in case one ejector is lost. With the structure of the three bill inserts, only one lure is needed to cover a variety of water depths No tools are required to position the bill inserts within the body portions because they automatically lock into place with a locking tab. Each bill insert is easily released by pressure being applied to the locking tab when the ejector tool is placed against the locking tab. Additionally, an internal rattling chamber adds to the lure's attractiveness to fish.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved universal crank bait lure for attracting and catching fish comprising in combination:

a rigid body portion having a head end, a tail end and a mid-section therebetween, the body portion having a top side with scale indicia thereon and a bottom side, the head end having facial indicia thereon, the tail end having a rear eyelet for having a rear hook attached thereto, the mid-section having a bottom eyelet projecting from the bottom side and capable of having a bottom hook attached thereto;

a plurality of interchangeable, rigid bill inserts having a generally rectangular shape, each bill insert having a back end and a front end, the back end of each bill insert having a locking tab centrally positioned therein, the back end of each bill insert being positionable within an opening of the head end of the body portion, the locking tab of each bill insert being capable of engaging an interior ledge of the opening with a snap-fit, the locking tab of each bill insert being capable of allowing each bill insert to be singly secured within the body portion when the back end being positioned therein;

each bill insert having an eye hook attached thereon and midway between the front end and the back end, the eye hook of each bill insert being capable of having fishing line tied thereto, the front end of each bill insert being capable of providing a diving plane for the body portion, the diving plane of each bill insert varying in length from that of another bill insert for varying the running depth of the body portion;

an elongated passage being accessible from the bottom side of the head end, the passage interconnecting with the opening of the head end of the body portion near the interior ledge thereof, the passage being capable of receiving an ejector tool therein, the ejector having a handle portion and a cylindrical shaft projecting from the handle, the shaft of the ejector being positionable within the passage for engaging the locking tab of each of the bill inserts when positioned within the head end, the shaft being capable of applying a lift force to the locking tab to allow release of each bill insert from within the head end, and a generally pyramidal rattling chamber being positioned within the body portion, the chamber having a plurality of rigid balls loosely positioned therein, each ball having a substantially spherical diameter and capable of rolling within the chamber for the creation of a rattling sound, the chamber with the balls therein being centrally positioned within the body portion for maintaining a proportionate weight balance when each of the bill inserts being attached.

2. A universal crank bait lure comprising:

a rigid body portion having a head end and at least one hook attached thereto;

a plurality of interchangeable, rigid bill inserts each having a back end with a locking tab, and positonable within an opening of the head end of the body portion, the locking tab of each bill insert being capable of engaging an interior ledge of the opening with a snap fit;

each bill insert having an eye hook attached midway between a front end and the back end, and capable of having fishing line tied thereto; and a passage being accessible from a bottom side of the head end and interconnecting with the opening of the head end of the body portion, the passage being capable of receiving therein an ejector tool having a shaft for positioning within, the shaft being capable of applying a lift force to the locking tab for release of each bill insert from within the head end.

3. The universal crank bait lure as set forth in claim 2, wherein the body portion having a tail end with a rear eyelet for having a rear hook attached thereto, and a mid-section with a bottom eyelet projection from the bottom side and capable of having a bottom hook attached thereto, and the head end of the body portion having facial indicia thereon.

4. The universal crank bait lure as set forth in claim 2, wherein each rigid bill insert having a generally rectangular shape, and the locking tab of the back end being centrally positioned therein and capable of allowing each bill insert to be singly secured within the body portion with the back end being positioned therein.

5. The universal crank bait lure as set forth in claim 2, wherein the front end of each bill insert being capable of providing a diving plane for the body portion, the diving plane of each bill insert varying in length from that of another bill insert for varying the running depth of body portion.

6. The universal crank bait lure as set forth in claim 5, wherein the ejector tool having a handle portion with a hole therein and the shaft projecting from the handle for engaging the locking tab of each of the bill inserts when positioned within the passage of the head end.

7. The universal crank bait lure as set forth in claim 2, wherein a generally pyramidal rattling chamber with a plurality of balls being positioned within the body portion, and the chamber with the balls therein being centrally positioned within the body portion for maintaining a proportionate weight balance when each of the bill inserts being attached.

8. The universal crank bait lure as set forth in claim 7, wherein each ball being positioned within the chamber having a substantially spherical diameter and capable or rolling within the chamber for the creation of a rattling sound that will attract fish.

* * * * *